United States Patent [19]

Coughlan, III et al.

[11] Patent Number: 5,448,890
[45] Date of Patent: Sep. 12, 1995

[54] FUEL SUPPLY APPARATUS WITH COOLED CHECK VALVE

[75] Inventors: Joseph D. Coughlan, III, South Glastonbury; Kevin J. Fire, Manchester, both of Conn.

[73] Assignee: United Technologies Corporation, Hartford, Conn.

[21] Appl. No.: 217,475

[22] Filed: Mar. 24, 1994

[51] Int. Cl.6 .............................................. F02C 7/228
[52] U.S. Cl. ....................................... 60/747; 60/734
[58] Field of Search ............ 60/39.091, 39.092, 39.826, 60/266, 734, 739, 741, 746, 747

[56] References Cited

U.S. PATENT DOCUMENTS 3,335,567  8/1967  Hemsworth ........................... 60/739
3,995,660  12/1967  Kast ..................................... 60/734
5,339,636  8/1994  Donnelly et al. .................... 60/734

*Primary Examiner*—Louis J. Casaregola
*Attorney, Agent, or Firm*—Marina F. Cunningham

[57] ABSTRACT

A gas turbine engine (10) includes a multi-stage combustion chamber (19) having a pilot stage (22) and a main stage (24), wherein during the low power setting only the pilot stage (22) is operating. During the non-operation of the main stage (24) a problem of coking occurs in a fuel supply system in general, and in a check valve (30) distributing fuel to the main stage, in particular. The check valve (30) is cooled by pilot fuel flowing through an auxiliary chamber (52) and is insulated by an air jacket (60) that is formed between the outer housing and the inner housing of the check valve.

4 Claims, 3 Drawing Sheets

FUEL SUPPLY APPARATUS WITH COOLED CHECK VALVE

TECHNICAL FIELD

This invention relates to turbine engines and, more particularly, to check valves for a fuel supply system therefor.

BACKGROUND OF THE INVENTION

A typical gas turbine engine includes a compressor, a combustion section, and a turbine. Air flows axially through the engine. The air is compressed in the compressor and emerges therefrom at an elevated pressure and temperature. The pressurized air enters the combustor through a plurality of openings therein. A supply of fuel is delivered into the combustor from an exterior fuel tank through a fuel supply system and is dispersed into the combustor chamber through a plurality of fuel nozzles. As the compressed air and fuel are mixed, an ignitor plug, disposed within the chamber, ignites the mixture thereby resulting in combustion thereof. The hot, gaseous products of combustion subsequently expand and drive the turbine, which in turn drives the compressor, and are ultimately exhausted from the engine to produce thrust.

As is well known, any combustion process results in the production of various emissions, including nitrogen-oxygen compounds. The level of production of nitrogen-oxygen compounds is a function of the engine power setting. A low power setting corresponds to idle power and approach, whereas a high power setting corresponds to take-off, climb, and cruise. During the high power setting, levels of nitrogen-oxygen compounds emitted by the engine are substantially increased over levels of nitrogen-oxygen compounds emitted by the engine during the low power setting.

The nitrogen-oxygen compounds are hazardous to the environment because they deplete the ozone layer. Since gas turbine engines produce the greatest amount of nitrogen-oxygen compounds at high altitudes, the depletion of the ozone layer is more immediate with gas turbine engines operating at high altitudes than from other combustion processes, such as the operation of automobiles at sea level. Thus, there is an ongoing effort to reduce the levels of nitrogen-oxygen emissions in aircraft gas turbine engines in order to preserve the ozone layer.

One approach to reduce the nitrogen-oxygen emission level is through the introduction of multi-stage combustion. U.S. Pat. No. 4,265,615 entitled "Fuel Injection System For Low Emission Burners", issued to Lohmann and Markowski, discloses a dual stage combustion section with a main burner and a pilot burner. At a low power setting, the engine operates only with the pilot burner. As the power setting increases, the main burner begins to operate, and continues to operate throughout the high power setting. As the engine returns to the low power setting, the main burner is turned off and only the pilot burner operates.

Although multi-stage combustion reduces the level of nitrogen-oxygen compound emissions, another problem comes to the forefront. In multi-stage combustion engines, a problem of coking within the intricate fuel supply system becomes more acute. Coking is a thickening of any residual jet fuel that is stagnant at a certain location within the fuel system passages. When stagnant fuel is heated, it solidifies and can actually plug the fuel supply system.

Although coking does occur in conventional engines with single stage combustors as the engine cools following operation thereof, multi-stage combustion engines are particularly susceptible to coking because fuel tends to stagnate and get heated within the system when only one stage is operating. Coking occurs in the main burner fuel supply system after the engine is switched from the high power setting, where the main burner is operating, to the low power setting, where the main burner is no longer operating. Although the main burner is shut off during low power and the fuel is no longer flowing therethrough, the engine still operates and maintains its high ambient temperatures. The residual fuel that remains in the main burner fuel supply system gets heated and can solidify, thereby plugging the fuel lines.

Coking is particularly problematic at a check valve disposed within the fuel delivery system because the check valve is attached to the engine and it tends to get very hot by means of thermal conduction from the engine. The check valve is critical to the fuel flow within the fuel supply system. If the check valve is plugged, the fuel cannot be delivered to the main burner, thereby impeding the overall performance of the engine.

DISCLOSURE OF THE INVENTION

It is an object of the present invention to reduce coking within a check valve disposed within a fuel supply system of a gas turbine engine.

According to the present invention, stagnant fuel in a check valve is cooled by pilot fuel flow and insulated from a hot gas turbine engine by an air jacket, to reduce coking. The check valve, utilized in a fuel supply system distributing fuel to a multi-stage combustor having a pilot stage and a main stage, includes a check valve mechanism disposed within an outer housing and an inner housing disposed concentrically inward of the outer housing to define the air jacket therebetween. The check valve also includes a heat exchanger comprising an inner shell disposed inward from the outer housing to define an auxiliary chamber therebetween and accommodating pilot cooling fuel therein. The inner shell and inner housing define an inner chamber that houses the check valve mechanism.

The auxiliary chamber communicates with a pilot fuel inlet and a pilot fuel outlet and surrounds the inner chamber. As the cooling fuel enters the pilot fuel inlet, it passes through the auxiliary chamber, thereby cooling the inner chamber before exiting through the pilot fuel outlet. The auxiliary chamber provides cooling to the inner chamber during the operation of the engine at low power settings when the main nozzle is not used, thereby preventing coking within the check valve due to residual fuel getting heated therein. The air jacket provides an insulating layer between the check valve outer housing abutting the high temperature engine and the residual fuel remaining within the inner chamber of the check valve.

The primary advantage of the present invention is that cooling the check valve does not require significant additional hardware or the addition of extra weight to the engine, since it utilizes existing fuel flow as a coolant.

The foregoing and other objects and advantages of the present invention become more apparent in light of the following detailed description of the exemplary embodiments thereof, as illustrated in the accompanying drawings.

BEST MODE FOR CARRYING OUT THE INVENTION

Figure 1:
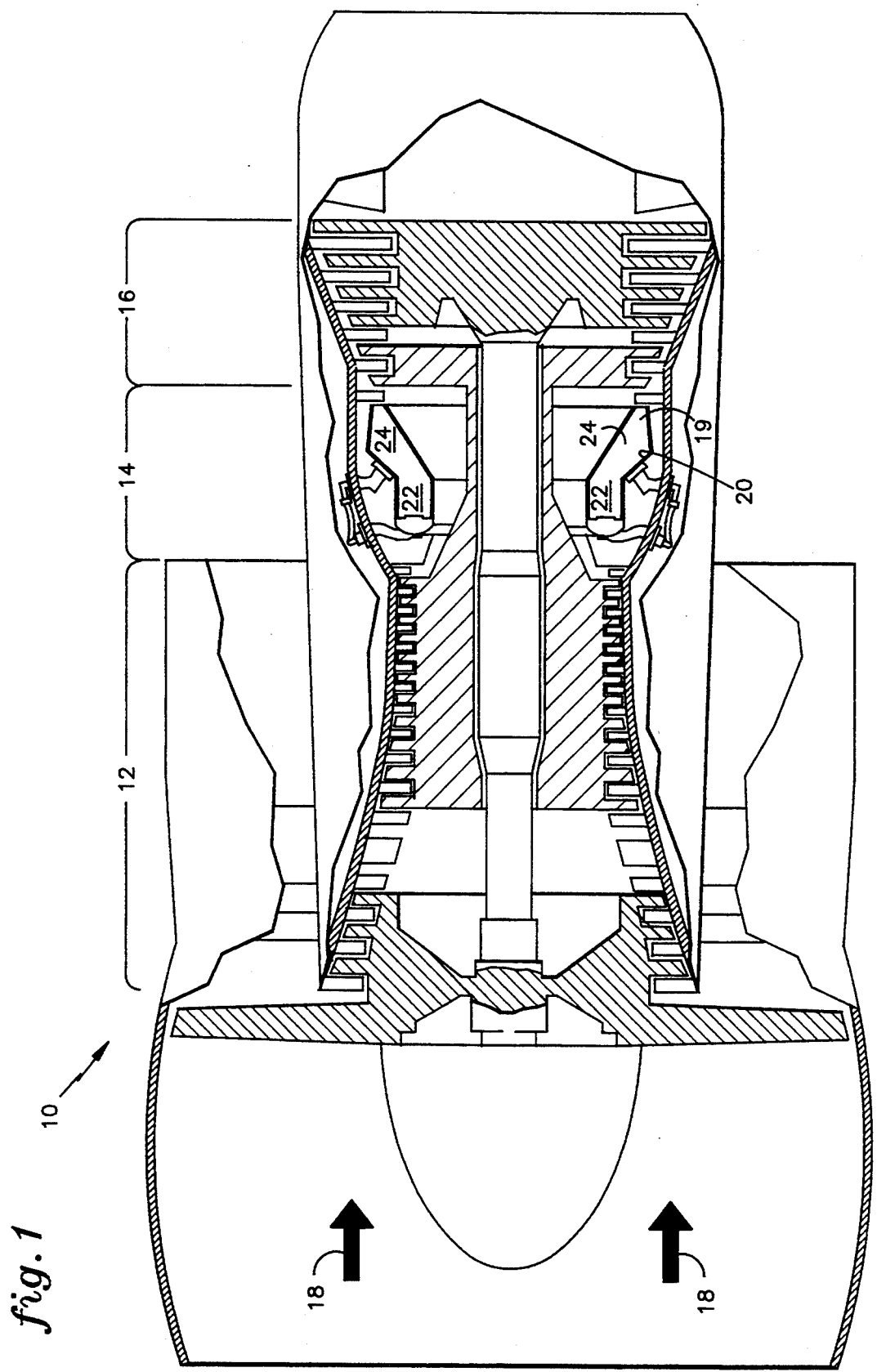
FIG. 1 is a schematic, sectional elevation of a gas turbine engine with a multi-stage combustor, a portion thereof cut away to show internal details.

Referring to FIG. 1, a gas turbine engine 10 includes a compressor section 12, a combustion section 14, and a turbine section 16. Air 18 flows axially through the sections 12-16 of the engine 10. As is well known in the art, air 18, compressed in the compressor 12, is mixed with fuel which is burned in the combustor 14 and expanded in the turbine 16. The hot products of combustion, expanded in the turbine 16, produce thrust to propel the engine 10 and drive the turbine 16 which in turn drives the compressor 12.

Figure 2:
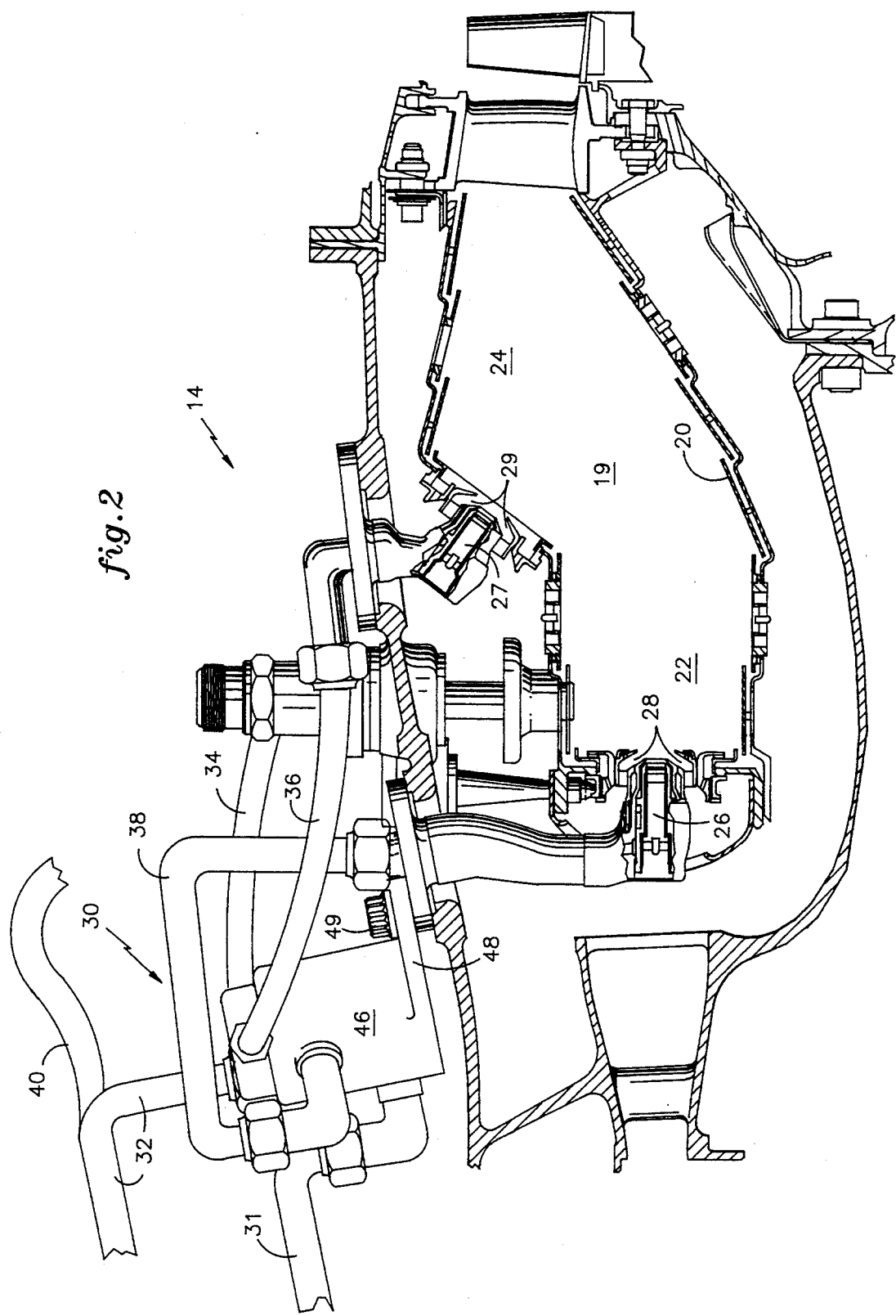
FIG. 2 is an enlarged sectional elevation of the multi-stage combustor of FIG. 1 with a check valve according to the present invention.

The combustion section 14 includes a combustion chamber 19 defined by a combustion chamber wall 20, as shown in FIG. 1 and in greater detail in FIG. 2. The combustion chamber 19 is a two stage combustor having a pilot stage 22 and a main stage 24. The main stage 24 is radially and axially offset from the pilot stage 22. A plurality of pilot stage fuel nozzles 26, disposed circumferencially around the combustion chamber 19, are mounted in the combustor chamber wall 20 within the pilot stage 22 thereof. A plurality of main stage fuel nozzles 27, also disposed circumferencially around the combustor chamber 19, are mounted in the combustor chamber wall 20 within the main stage 24 thereof. The fuel nozzles 26, 27 disperse fuel into the combustor chamber 19 during the operation thereof.

Air exiting the compressor 12 enters the combustion chamber 19 through a plurality of bulkhead openings 28, 29 that are formed around the fuel nozzles 26, 28, respectively, to mix with fuel sprayed into the chamber through the nozzles. A check valve 30 is disposed upstream from the nozzles 26, 27 and is a part of the fuel supply system, the rest of which is not shown for clarity. A main fuel inlet 31 and a pilot fuel inlet 32 deliver fuel from a fuel tank (not shown) to the check valve 30. A first main fuel outlet 34 and a second main fuel outlet 36 deliver fuel from the check valve 30 to a pair of adjacent main nozzles 27. A pilot fuel outlet 38 delivers fuel from the check valve to the pilot nozzle 26. A pilot fuel line 40 delivers fuel from the fuel tank directly to the adjacent pilot nozzle 26, thus, bypassing the check valve 30.

Figure 3:
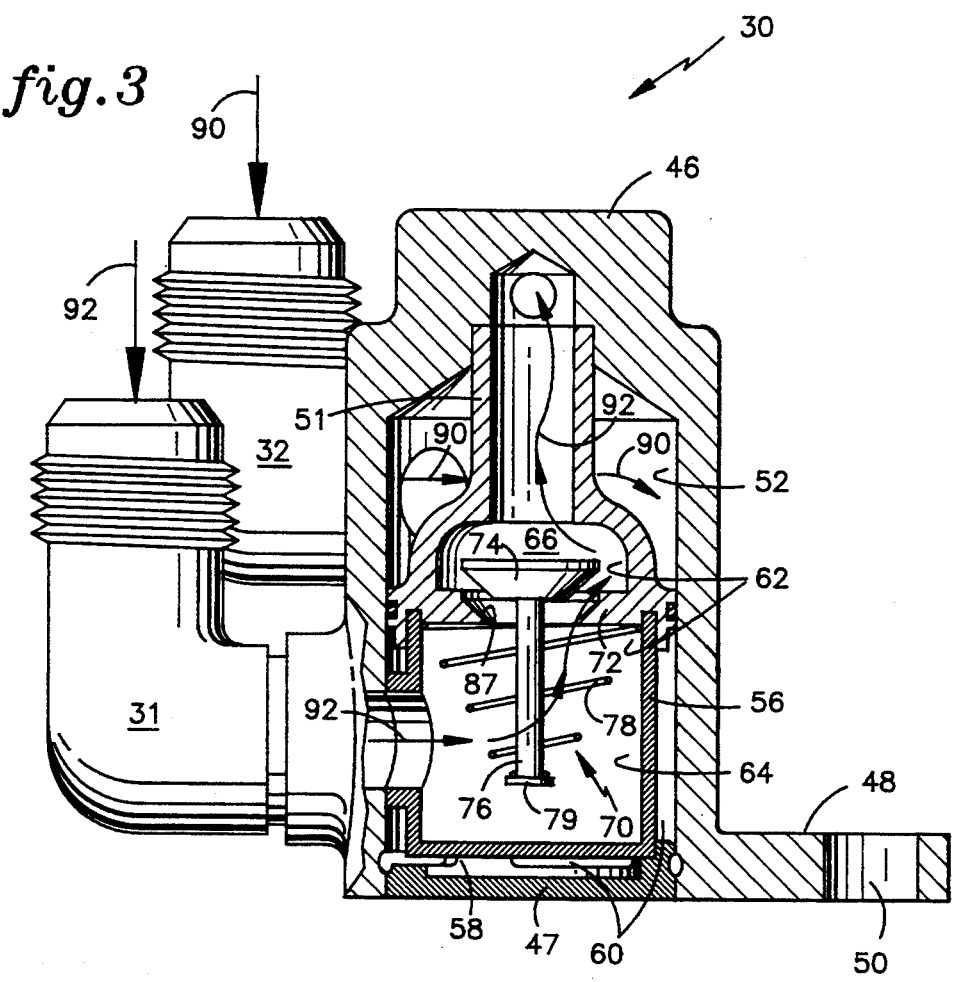
FIG. 3 is an enlarged sectional elevation of the check valve of FIG. 2.
Figure 4:
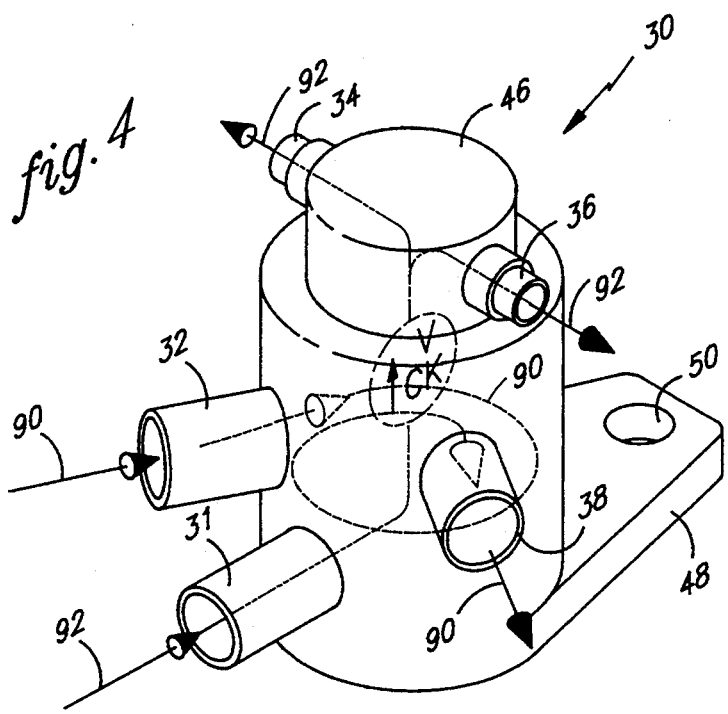
FIG. 4 is an isometric schematic view of the check valve of FIG. 3.

Referring to FIG. 3, each check valve 30 includes an outer housing 46 with a bottom plate 47 attached thereto to effect closure thereof. A mounting lug 48 is integrally formed from the outer housing 46 to facilitate the attachment of the check valve 30 onto the engine 10 by means of a bolt 49 inserted through an aperture 50, as best seen in FIG. 2. The check valve 30 includes an inner shell 51 attaching to the outer housing 46 and defining an auxiliary chamber 52 between the outer housing 46 and the inner shell 51. The check valve also includes an inner housing 56 disposed concentrically inward from the outer housing 46 and set apart from the outer housing 46 and from the bottom plate 47 by standoffs 58 to define an air jacket 60 therebetween. The inner housing 56 and the inner shell 51 define an inner chamber 62 therebetween.

The inner chamber 62 is subdivided into a lower portion 64 and an upper portion 66 by a check valve mechanism 70. The check valve mechanism 70 comprises a seat 72 that is integrally formed from the inner shell 51, and a valve element 74 that seals to the seat 72. The valve element 74 includes a stem 76 received within a coil spring 78 restrained by a retainer 79 and the seat 72.

The auxiliary chamber 52 is in communication with the pilot fuel inlet 32 and the pilot fuel outlet 38. The direction of the cooling pilot flow through the auxiliary chamber is identified by arrow 90. The lower portion 64 of the inner chamber 62 is in communication with the main fuel inlet 31. The upper portion 66 of the inner chamber 62 is in communication with the first main fuel outlet 34 and with the second main fuel outlet 36. The direction of the main fuel through the inner chamber 62 of the check valve 30 is indicated by arrow 92.

The check valve mechanism 70 has an open position, as shown in FIG. 3, and a closed position. In the open position, the valve element 74 is unseated from the seat 72 allowing fuel flow from the lower portion 64 to the upper portion 66 through an opening 87. In the closed position, the valve element 74 is seated on the seat 72, closing off the fuel flow from the lower portion 64 into the upper portion 66.

During the operation of the engine, the fuel from the fuel tank is delivered through the fuel supply system and through the check valve 30 to the main nozzles 27 and some of the pilot nozzles 26. Other pilot nozzles 26 receive pilot fuel through the pilot fuel line 40, bypassing the check valve 30. The nozzles 26, 27 disperse the fuel into the combustor 19 wherein the fuel is mixed with hot gases entering into the combustor through the bulkhead openings 28, 29. The hot gas and fuel mixture is then ignited and burned.

At low power settings, such as at idle power, only the pilot stage 22 is operating. During inoperation of the main stage 24, the fuel supply to the main fuel inlet 31 is cut off upstream of the check valve 30 by a fuel valve (not shown). The fuel enters the lower portion 64 of the inner chamber 62 of the check valve 30 through the main inlet 31. Since the pressure of the fuel in the lower portion 64 is low because the supply is cut off, the pressure is not sufficient to unseat the valve element and thus the check valve 30 remains in the closed position. When the check valve 30 is in the closed position, a small amount of fuel that may be remaining within the lower portion 64 cannot proceed into the upper portion 66 of the inner chamber 62.

As the engine 10 shifts into the high power setting, such as during climb or cruise, both the pilot and the main burners operate. As the pressure within the main inlet 31 and, subsequently, within the lower portion 64 builds up, the valve element 74 moves upward. As the valve element 74 becomes unseated, fuel flows from the lower portion 64 of the inner chamber 62 into the upper portion 66 of the inner chamber 62 through the opening 87. The fuel can then proceed to the main nozzles 27 through the first and second main outlets 34, 36, as arrows 92 indicate.

The fuel supply to the main nozzles 27 stops when the engine is switched to the low power setting. When the fuel supply to the main nozzles is shut off, the pressure of the fuel is reduced within the main inlet 31 and, subsequently, within the lower portion 64 of the inner chamber 62. Due to insufficient pressure to maintain the valve element unseated, the valve element 74 moves into a closed position and cuts off the fuel supply to the upper portion 66 of the inner chamber 62. Some residual fuel remains within the upper portion 66 and the lower portion 64 of the inner chamber 62. Since the engine is still operating, the high surrounding temperatures prevail. The check valve 30 is subjected to these high temperatures through conduction of heat from the engine and the outside temperatures through the outer housing. The residual fuel within the check valve 30 can coke and result in plugged passages if it is not sufficiently cooled.

The auxiliary chamber 52, functioning as a heat exchanger, surrounds the inner chamber 62 and provides the necessary cooling to prevent coking. Pilot fuel, destined for one of the two adjacent pilot nozzles 26, is channeled from the fuel tank through the pilot fuel inlet 32, then through the auxiliary chamber 52 and finally through the pilot outlet 38. The fuel emerging from the fuel tank is cool relative to the temperature of the engine, and thus provides cooling to the check valve 30 by means of convection.

The air jacket 60, provides an insulating layer of air between the outer housing 46, which is exposed to the high ambient temperature, and the lower portion 64 of the check valve 30, which has stagnant fuel therein to further reduce heating of the check valve and coking of fuel therebetween.

Although the invention has been shown and described with respect to exemplary embodiments thereof, it should be understood by those skilled in the art that various changes, omissions, and additions may be made thereto, without departing from the spirit and scope of the invention. For instance, the number of fuel inlets and outlets may vary without any impact on the present invention.

We claim:

1. A fuel supply apparatus for controlling distribution of fuel into a combustion chamber in a gas turbine engine wherein said combustion chamber has a pilot stage and a main stage, said fuel supply apparatus having an outer housing and a check valve mechanism disposed within said outer housing, said check valve mechanism having an open and closed position, said check valve mechanism communicating with a main fuel inlet and a main fuel outlet said fuel supply apparatus characterized by:

a heat exchanger in heat transfer relationship with said check valve mechanism and accommodating flow of pilot fuel therethrough to convectively cool said check valve mechanism to prevent coking of stagnant fuel therewithin; and an inner housing disposed concentrically inward from said outer housing resulting in an air jacket between said inner housing and said outer housing to insulate said check valve mechanism from hot temperatures of said gas turbine engine.

2. The fuel supply apparatus according to claim 1 wherein said heat exchanger comprises an inner shell disposed inwardly from said outer housing to define an auxiliary chamber therebetween, and said inner shell and said inner housing define and inner chamber therebetween, said inner chamber accommodating said check valve mechanism therein.

3. The fuel supply apparatus according to claim 2 wherein said auxiliary chamber is in communication with a pilot fuel inlet and a pilot fuel outlet such that the fuel enters said auxiliary chamber through said pilot fuel inlet and exits said auxiliary chamber through said pilot fuel outlet.

4. The fuel supply apparatus according to claim 1 wherein said inner chamber comprises a lower portion and an upper portion, said lower portion is in communication with said main fuel inlet, said upper portion is in communication with said main fuel outlet so that when said check valve mechanism is in said open position the fuel enters said lower portion of said inner chamber through said main fuel inlet and flows through said check valve mechanism into said upper portion of said inner chamber and exits through said main fuel outlet.

* * * * *